Patented Mar. 6, 1923.

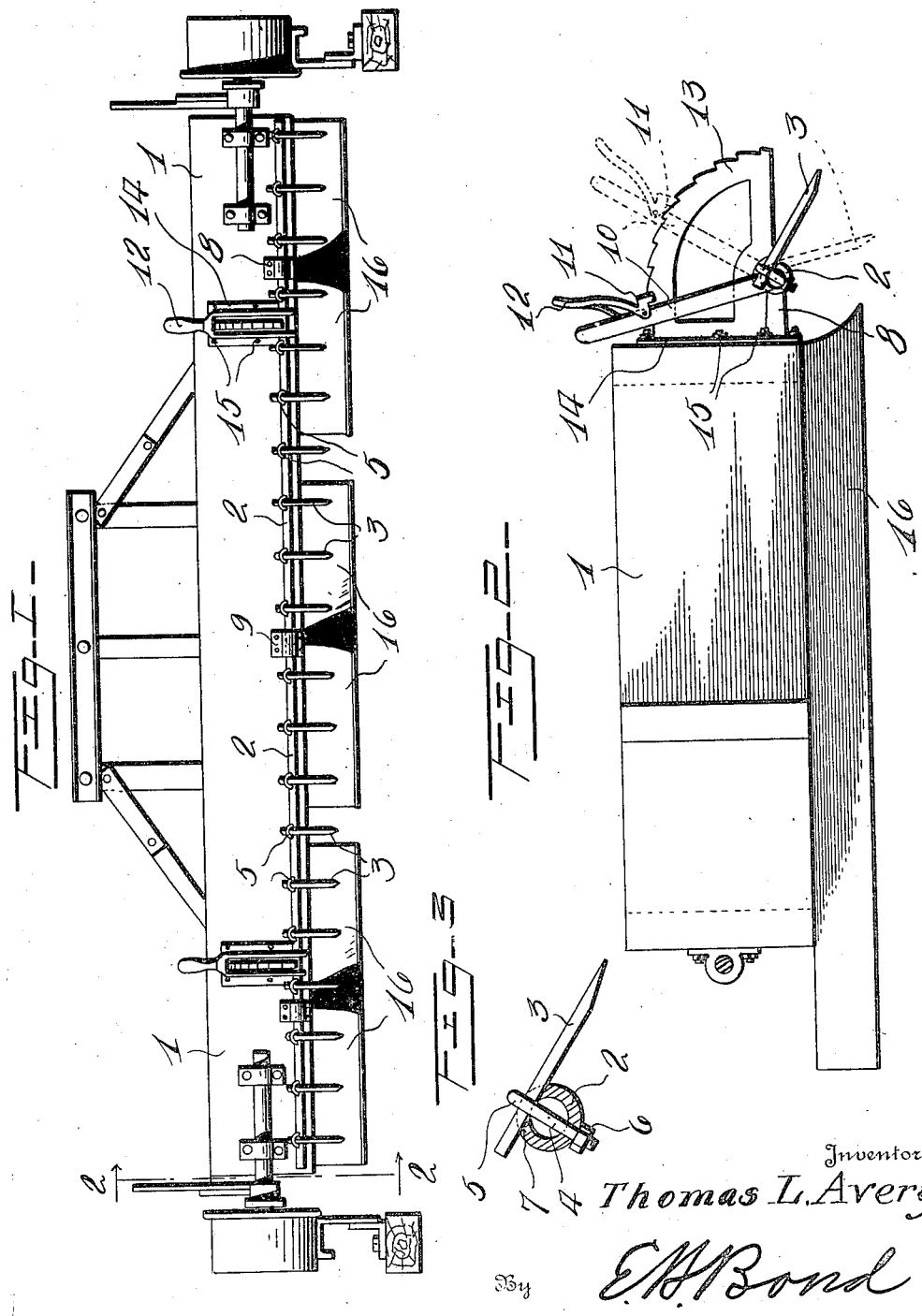

1,447,504

UNITED STATES PATENT OFFICE.

THOMAS LUCIAN AVERY, OF PHOENIX, ARIZONA.

SCARIFIER ATTACHMENT FOR SUBGRADERS.

Application filed August 22, 1921. Serial No. 494,397.

*To all whom it may concern:*

Be it known that I, THOMAS L. AVERY, a citizen of the United States, residing at Phoenix, in the county of Maricopa and State of Arizona, have invented certain new and useful Improvements in Scarifier Attachments for Subgraders, of which the following is a specification.

This invention relates to certain new and useful improvements in scarifier attachments designed primarily for use on sub-graders.

The present invention has for its objects among others to provide a simple device of this character, capable of manufacture at small cost, readily attached to sub-graders already in use and which shall be efficient and not liable to injury or to get out of order. The attachment may be made as a unit, in one or more sections, and applicable to sub-graders without any change whatsoever in the latter.

Other objects and advantages of the invention will hereinafter appear and the novel features thereof will be particularly pointed out in the appended claim.

The invention is clearly illustrated in the accompanying drawings, which, with the numerals of reference marked thereon, form a part of this specification, and in which—

Figure 1 is a front elevation of a subgrader with my present improvement applied.

Figure 2 is a vertical section on the line 2—2 of Figure 1, looking in the direction of the arrows.

Figure 3 is an enlarged detail, partly in section and partly in elevation, showing the manner in which the teeth are secured to their shaft.

Like numerals of reference indicate like parts throughout the different views.

Referring to the drawings, 1 designates the sub-grader frame, of any of the well-known or approved forms of construction, and to which my attachment is applied.

The attachment, in the present instance, embodies two like parts, each part comprising a shaft 2 which is preferably of tubular form, as seen in Figure 3, and to which are attached teeth 3 of any well-known or preferred type. The teeth, in the present instance, are secured to the shaft by means of a bolt 4, one for each tooth, the said bolt having a curved or U-shaped upper portion 5, the shank of said bolt passing through the shaft and receiving upon its other end a nut 6. The shaft is slotted, as seen at 7 in Figure 3, in which slot the shank of the tooth is disposed, as seen in Figure 3, so that when the nut 6 is screwed up, the tooth will be held firmly in the slot and prevented from movement laterally or vertically, thus forming a very rigid connection between the tooth and shaft. These teeth are disposed at substantially four inches apart, although it is evident that this distance may be varied as occasion may require.

The shaft 2 is supported in suitable bearings 8 and 9 which are secured to the front end of the grader frame, as shown best in Figure 2, and in the present instance where two of these toothed shafts are shown the center bearing 9 is made of greater dimensions than the others and receives the abutting ends of the two shafts, as seen clearly in Figure 1. The bearings are readily attachable to the grader frame, and on each shaft is mounted a lever 10 having a spring-actuated pawl 11, the handle 12 of which is disposed within convenient reach of the operator, as seen in Figure 1, and this pawl is designed for cooperation with the toothed segment 13 carried by the attaching plate 14 which can be readily affixed to the sub-grader frame by suitable means, as the bolts and nuts 15, as seen best in Figure 2.

As seen in Figure 2, the teeth are arranged in advance of the scrapers 16 of the sub-grader and when not in use may be raised into inoperative position, as indicated by full lines in Figure 2, and by means of the lever 10 forced down into operative position, as shown by dotted lines in said Figure 2, so that in use the teeth scarify or break up or loosen the hard earth which is thereafter acted upon by the scrapers.

Modifications in detail may be resorted to without departing from the spirit of the invention or sacrificing any of its advantages.

What is claimed as new is:—

A sub-grader attachment comprising an attaching plate, a segment carried thereby, bearings for a shaft, a tubular shaft mounted in said bearings, a pawl and lever carried by said shaft, the said shaft being transversely slotted, and teeth disposed in said slots and held thereon at an angle to the horizontal, and the whole attachable to the frame of a sub-grader.

In testimony whereof I affix my signature.

THOMAS LUCIAN AVERY.